United States Patent [19]
Schumacher et al.

[11] Patent Number: 5,143,481
[45] Date of Patent: Sep. 1, 1992

[54] METHOD OF TREATING MUNICIPAL SEWAGE SLUDGE AND PRODUCT PRODUCED THEREBY

[75] Inventors: Glenn O. Schumacher, Medina; LaVerne Weber, Elgin; Mitchell Nowicki, Naperville; Alan Dunbar, Plainfield; Jeffrey M. Douglas, Palos Park, all of Ill.

[73] Assignee: American Fly Ash Company, Naperville, Ill.

[21] Appl. No.: 679,510

[22] Filed: Apr. 18, 1991

[51] Int. Cl.[5] .................................. B09B 1/00
[52] U.S. Cl. .................................. 405/129; 106/900; 405/128; 405/263
[58] Field of Search .................... 405/128, 129, 263; 210/751, 170; 110/DIG. 1; 106/710, 707

[56] References Cited

U.S. PATENT DOCUMENTS

| | | | |
|---|---|---|---|
| 4,028,130 | 6/1977 | Webster et al. | 405/129 X |
| 4,226,630 | 10/1980 | Styron | 210/751 |
| 4,925,571 | 5/1990 | Jacobs et al. | 210/764 X |
| 4,981,600 | 1/1991 | Tobler et al. | 210/751 X |
| 5,013,458 | 5/1991 | Christy et al. | 210/751 |

Primary Examiner—Dennis L. Taylor
Attorney, Agent, or Firm—Baker & McKenzie

[57] ABSTRACT

The invention relates to a method of utilizing sewage sludge to form a stablized sterile or pasteurized material which can be used as fertilizer, as fill for land development, or as a cover in solid-waste disposal applications. Fluidized bed combustion residue, fly ash, or FBCR and fly ash are added directly to the sewage sludge exothermic heat is released and the mixture is cured in order to eliminate bacterial and other pathogenic agents. The mixture has a soil-like consistancy, making it spreadable. The mixture has both the nutritive benefits of sewage sludge as a fertilizer and alkalinity for treatment of overly acidic soil.

8 Claims, 4 Drawing Sheets

METHOD OF TREATING MUNICIPAL SEWAGE SLUDGE AND PRODUCT PRODUCED THEREBY

This is a continuation of application Ser. No. 405,437, filed Sep. 11, 1989 now U.S. Pat. No. 5,051,031, which is a continuation-in-part of application Ser. No. 257,170, filed Oct. 12, 1988, which is a continuation of application Ser. No. 921,177, filed Oct. 20, 1986, now abandoned.

BACKGROUND AND SUMMARY OF THE INVENTION

This invention relates to a method of using waste materials to form a material usable as a fertilizer fill material or landfill cover. The invention relates to the combination of municipal sewage sludge and combustion residue such as that produced in coal burning electricity generating operations.

Fly ash is essentially fine solid noncombustible mineral residue typically resulting from coal-burning operations. It does not however include other more coarse combustion by-products such as bottom ash, cinders, or slag. Fly ash typically comprises very fine particles, usually containing silica ($SiO_2$), alumina ($Al_2O_3$), ferric oxide ($Fe_2O_3$), calcium oxides ($CaO$), and small quantities of other oxides and alkalies. Fly ash is an artificial possolan and is generally not cementious in itself, but with the presence of water and lime compounds, it forms a cementious product. These lime compounds often exist naturally in the fly ash or can be supplied by the addition of a lime source such as cement or kiln dusts.

Fly ash by-product can be a problem for many coal burning industries, because the fly ash can be swept away by ordinary air currents, thereby polluting the air and ultimately settling in undesirable places. As a result, the coal-burning industry must be ever mindful of present and possible future environmental regulation, potential negative public opinion, and potential legal liability.

The methods of wasting fly ash which have traditionally been used are the "sluicing" method and the "dampening" method.

The "sluicing" method mixes fly ash and liquid to a liquid content of greater than 90% by weight. The mixture is then pumped into a holding pond where it is exposed to ambient conditions and allowed to dry until the next batch of fly ash and water is added.

The sluicing process has several disadvantages. First, in arid regions, large quantities of liquid are sometimes not readily available or only available at a very high cost. Second, the sluicing method often requires expensive site preparation, including the need for special cell liners and embankments. Third, the volume of water used in this method causes it to be very land consumptive, and the necessary land is not always available. Finally, a large holding pond of the end-product can be hazardous, because the cell liner or embankment could leak; also, wildlife or curious children could be attracted to the holding pond, which could result in any one of a number of serious consequences.

Due to the aforementioned disadvantages, the sluicing method of wasting fly ash is not well suited to the needs of today's coal-burning industry.

In the "dampening" method, just sufficient liquid is added to the dry fly ash to calm the dust, and this facilitates the handling of the fly ash with conventional earth moving equipment. Although the liquid content will vary with the type of fly ash, a liquid content of about 5% to about 25% by weight is typically used. Current dampening systems commonly mix a continuous flow of fly ash with a continuous flow of liquid. Although the liquid flow rate can be easily controlled, the fly ash flow rate often cannot; as a result, the liquid content of the dampened fly ash often varies by 50% or more. This lack of uniformity produces handling problems. At lower liquid concentrations, unwanted fugitive dust is often generated; at higher concentrations, the end product becomes a paste or sludge which makes handling more difficult. Dampening systems are therefore becoming less suitable for today's needs.

Due to the inadequacies of the sluicing and dampening methods, an innovative alternative method has been created and is disclosed in Pound, U.S. Pat. No. 4,313,762, "Method of Wasting Fly Ash and Product Produced Thereby" and Pound, U.S. Pat. No. 4,461,601, "Slurry System for Wasting Fly Ash Having Nonleachable Self-Sustaining End Product".

Briefly, the Pound patents disclose a fly ash disposal system where, after the fly ash cools and is removed from a coal-burning plant boiler, it is transported by conventional means to a closed storage area to await transportation to a site located some distance from the coal-burning facility. The bone dry fly ash is discharged from the power station storage area into a pneumatic bulk transport truck. After filling, the truck is sealed to prevent dust leakage during transit. The substantially dust free closed chambered transport vehicle then brings the fly ash to a processing plant storage unit. The fly ash is ultimately transferred from the storage unit into a slurrier where it is mixed with an amount of liquid. The resultant slurry is then discharged via a slurry pump to a disposal cell.

Sewage sludge is the end by-product of typical community waste treatment facilities. In typical sewage treatment facilities, the sludge is chemically conditioned and dewatered by vacuum filters. The dewatered sludge is then transferred to trailer dump trucks and hauled to a disposal site for further treatment or disposal.

Disposing of sewage sludge has been accomplished by a number of methods. In some waster disposal methods, the sludge is incinerated. However, incineration typically results in high energy costs. Furthermore, incineration disposal methods also produce gaseous by-products which may cause environmental concerns.

Other disposal processes involve the transporting of sludge to a disposal site in dump trucks. These trucks are then driven over refuse located at the disposal site. The sludge, including its contained water, is thereby dumped onto the refuse. The sludge is mixed with the refuse and then compacted with a bulldozer. In this way, the refuse is intended to soak up the liquid contained in the sludge, thereby reducing the environmental impact upon the surrounding region. The amount of sludge which can be mixed with refuse is typically controlled by regulatory agencies. Whether regulated or not, however, landfills can become saturated with waste, thereby generating environmental hazards and concerns.

Other methods of sewage disposal include burying the sewage sludge at a disposal site dedicated solely for such sludge. However, this method of disposal also raises environmental concerns due to ground water pollution, general instability and undesirable settling of the completed fill, and other hazards.

The effective and safe disposal of municipal sewage sludge is becoming more difficult. Locations where such material can be economically disposed are becoming more scarce. It has been found that methods previously thought safe are not completely effective in the long term. Sewage sludge contains large amounts of bacteria and other pathogens which must be destroyed or, at least, contained and prevented from spreading. The U.S. EPA has promulgated rules governing the type of processes that can be used to treat waste water sludge. These processes are directed at reducing pathogens at various levels.

Other prior art techniques for treating municipal sludge have included combining such sludge with fly ash and cement kiln dust, as suggested in U.S. Pat. Nos. 4,781,842; 4,554,002; 4,432,800; 4,341,562; 4,101,332; 4,038,095 and 4,018,617, or with fly ash and lime, as suggested in U.S. Pat. No. 4,028,130. However, depending upon their availability, kiln dust and lime can be prohibitively expensive to use.

It has been found that a material resulting from the use of a coal burning technique known as the fluidized bed process is usable as a replacement for lime. The fluidized bed process produces fluidized bed combustion residue ("FBCR") or bottom drain, which has been suggested for use, after wet pre-treatment (hydration) thereof, in combination with fly ash to stabilize scrubber sludge. In U.S. Pat. Nos. 4,250,134; 4,397,742; 4,344,796 and 4,397,801 (the "Minnick patents"), the inventor pretreats the FBCR with a process called "blunging", wherein water is added to the FBCR and the combination is mixed. The Minnick patents do not suggest the use of FBCR to treat municipal sludge.

In Nowicki et al, U.S. Pat. No. 4,472,198, "Process and System of Wasting Fly Ash And Product Produced Thereby", a method and system is disclosed for disposing of fly ash and liquid industrial waste. The product of this method is environmentally safe and comprises a mixture of dry fly ash and liquid additive having a liquid additive content of about 5%-25% by weight. The process relates to a mixing operation which closely controls the liquid additive to yield a uniformly conditioned product; this product can be subjected to earth handling equipment pressures almost immediately. The process also typically eliminates cell preparation and greatly reduces leaching at the disposal site.

However, the Nowicki process is not applicable to all forms of waste disposal. The disclosure of Nowicki is directed to liquid waste disposal which may not be suitable for sewage sludge disposal due to the sludge's non-aqueous physical properties.

The treatment of sewage sludge, as contrasted with the treatment of scrubber sludge, must address the serious problem of bacteria. Sewage sludge contains large amounts of bacteria which must be destroyed and prevented from regeneration. It may also contain amounts of undesirable "heavy" metals which must, in accordance with EPA regulations, be disposed of in a controlled manner. Generally, sewage sludge also contains a higher water-to-solids ratio than other industrial sludge.

On the other hand, sewage sludge contains many nutrients which make it a possible source of fertilizer. The handling and delivery of raw, de-watered sewage sludge is, however, difficult, because of odor, bacterial content, and other physical properties. Regulations concerning methods of handling and application can be found in Title 35 Subtitle C, "Land Applications of Municipal Sludge" from the EPA.

Also, the fact that sewage sludge is a result of human activity means that its source will necessarily be near densely populated areas. In contrast, scrubber sludge may be produced at power generating stations quite distant from populated areas, making disposal thereof less critical or less costly.

As a result, an object of this invention is to provide a fly ash and sewage sludge wasting method and system which is environmentally safe, economical and reliable.

It is an object of the present invention to treat municipal sewage sludge with FBCR, FBCR and fly ash, or fly ash alone for the purpose of solidification and/or detoxification.

Yet another object of the invention is to produce a fertilizer from municipal sewage sludge, which is easily stored, handled and delivered.

Still another object of the invention is to produce a material comprised of sewage sludge, an activator comprised of either FBCR, fly ash, or FBCR and fly ash, which is suitable for use as a landfill material.

Yet a further object of the invention is to produce a stabilized sewage sludge composition which is substantially free of pathogenic agents.

A further object of the invention is to provide a method of and system for wasting fly ash and sewage sludge whereby the fly ash is handled during transit and processed in a manner which is pollution free.

Yet another object is to provide a process and system of wasting fly ash and sewage sludge in which the end product will harden into a stable, environmentally acceptable mass.

Yet another object is to provide a fly ash and sewage sludge wasting system in which the final, hardened product meets all current environmental requirements, and is resistant to leaching and to percolation from ground water and rainfall whereby the pollution potential in the disposal area is greatly reduced.

Yet a further object is to provide a fly ash sewage sludge wasting system in which on-site dust at the disposal location is reduced to a minimum.

A further object is to provide a fly ash and sewage sludge wasting system and process which is more economical to operate than other conventional systems.

A still further object is to provide a sewage sludge and wasting system which is less land consumptive and more space efficient than previously known methods.

Other objects and features of the invention will become apparent to those skilled in the art from the following specification when read in conjunction with the annexed drawings.

These and other objects of the invention are obtained with a method by which sewage sludge, FBCR and fly ash are blended in a pug mill. The mixture is then stockpiled where it is allowed to cure for a minimum period of about 72 hours. During that period, the temperature of the mixture is maintained at a minimum level of about 100° F. The alkalinity of the mixture is such that its pH is not less than 10.

BRIEF DESCRIPTION OF THE DRAWINGS

The invention is illustrated more or less diagrammatically in the accompanying drawings wherein.

DETAILED DESCRIPTION OF THE INVENTION

Bone dry fly ash is conveyed by any conventional means from a coal-burning system to an adjacent storage silo. A bulk transport truck is positioned under the silo to receive the dry fly ash. These trucks are designed to be substantially air tight whenever all hatches and appurtenances are closed and are designed for pneumatic unloading. Trucks of this design are well known and need not be further described here.

Figure 1:
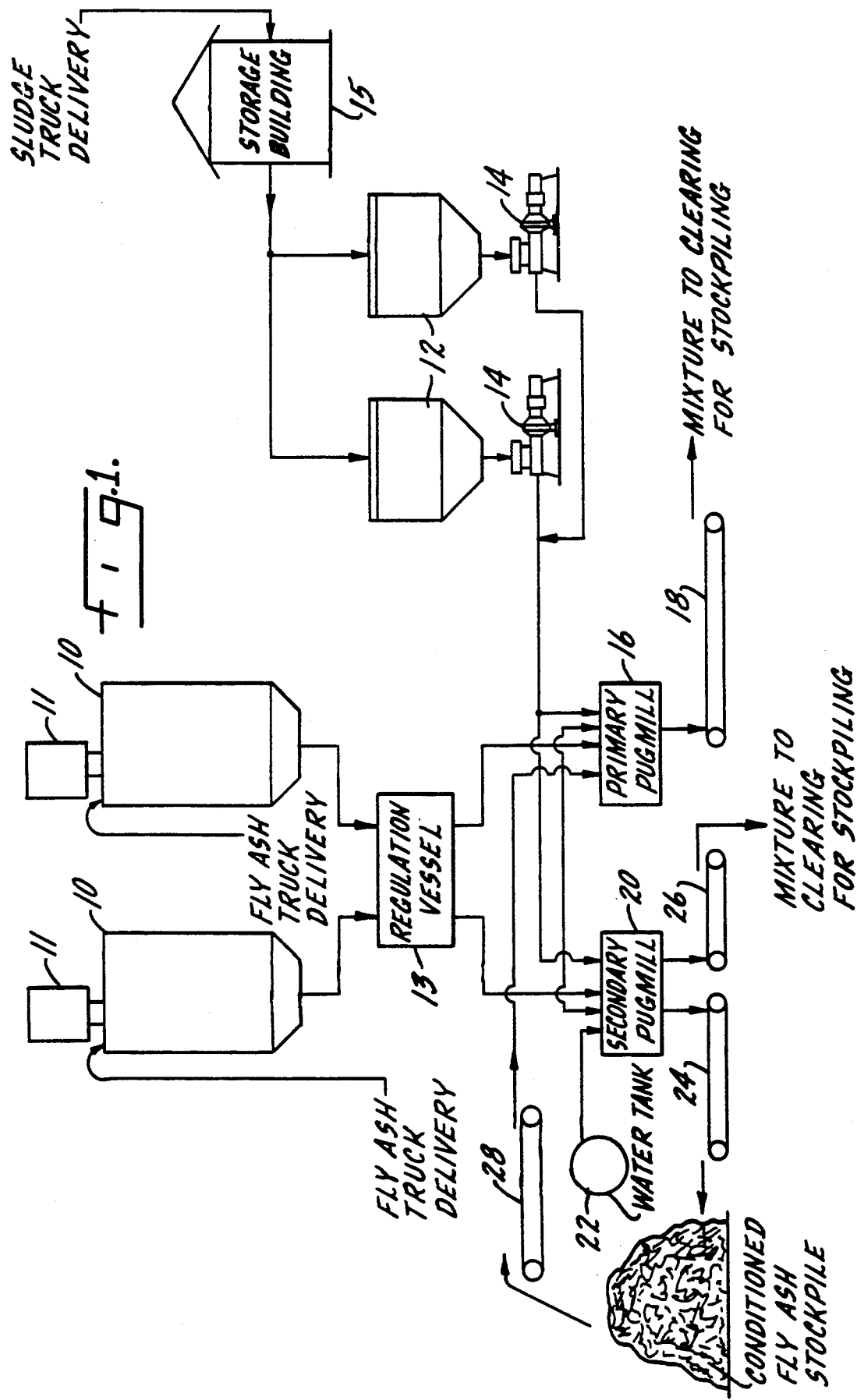
FIG. 1 is a process flow diagram which illustrates the preferred handling and processing steps in the wasting process.
Figure 2:
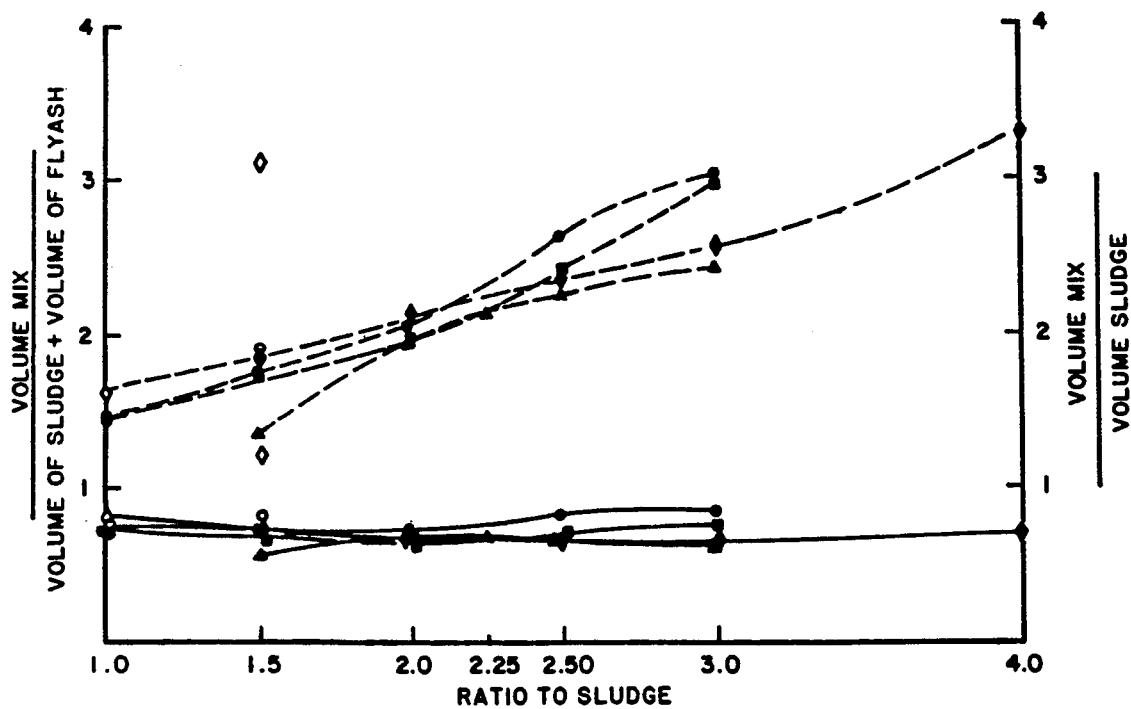
FIG. 2 is a graph illustrating volume of fly ash and sludge after mixing divided by the volume of the fly ash and sludge before mixing versus ratio of sludge to fly ash.

After receiving a load of dry fly ash at the generating station storage silo, the truck transport compartment hatches are fastened to form an air tight compartment, and the truck transports the fly ash to the processing plant. Here, the fly ash is pneumatically unloaded into fly ash site storage silos as indicated at 10 in the process flow diagram in FIG. 1. These silos have dust collectors 11, preventing any airborne fly ash from escaping from the silos during transfer and storage.

Sludge is a residue which is removed from conventional community sewage treatment facilities. At the treatment facility, the sludge is chemically conditioned and dewatered by vacuum filters. The resulting dewatered solids are then transferred to a tractor trailer dump truck, hauled to the processing plant, and dumped into a storage building 15. From this building, the sludge is transferred via a rubber tire endloader into sludge hoppers 12.

During disposal operations, the sludge is pumped from the sludge hopper 12 by means of a sludge (progressive cavity) pump 14 into a primary pugmill 16. The fly ash is transferred by a conventional air slide system from the fly ash storage silos 10 to an intermediate regulating vessel 13. This vessel serves to overcome natural fluctuations in fly ash flow as the fly ash is introduced at the top and allows for a more uniform flow of fly ash as it exits from the bottom. The fly ash is transported by gravity through a vane feeder at the base of the regulating vessel, down a conduit, and into the primary pugmill 16.

The fly ash is transferred to pugmill 16 simultaneously as the sludge is pumped to the pugmill by the sludge pump 14. Both transfer systems are controlled to provide the proper mix at the pugmill to form a homogeneous and environmentally acceptable mixture. The composition of the mixture is preferably $\frac{1}{2}$ to 4 parts fly ash to 1 part sludge by weight, and the composition is controlled by varying the speed of the sludge pump and adjusting the fly ash vane feeder. Variations in the physical properties of the sludge may require some adjustment in the flow rates of the fly ash and the sludge to achieve the proper end product. This end product should not contain too high a proportion of fly ash, or fugitive dust may occur. Nor should the end product contain too much sludge, otherwise the end product may not meet environmental requirements.

The resulting mixture is transferred by means of a first conveyor belt 18 to a clearing where the mixture is stockpiled. The processed fly ash and sludge is ultimately loaded with an endloader from these piles into dump trucks. These trucks transport the material to the working areas of a landfill. At the landfill, the material is placed and compacted both above and below grade, using conventional earth-moving equipment.

If large amounts of fly ash are stored at the disposal facility, the facility can also be equipped with a secondary pugmill 20 having two capabilities. First, the secondary pugmill can be used to mix dry fly ash with water (supplied from water tank 22) to a water content of about 10% by weight. The resulting "conditioned fly ash" mixture can then be transferred by a second conveyor belt 24 to be stockpiled at a convenient location.

The stockpiled mixture of fly ash and water can be stored until shortages of dry fly ash become apparent. As is now well-established, the addition of small quantities of fly ash to concrete is widely employed, because it enables freshly poured concrete to preserve advantageous flow characteristics and generally results in higher compression strengths; these characteristics are of particular importance when pouring structural concrete. However, demand for fly ash varies with the seasons. During warm weather months when construction activity is at its peak, fly ash generation may not be sufficient to supply demand. Conversely, during cold weather months, construction activity may be at a greatly reduced level, and the supply of fly ash may be much greater than demand. Consequently, stockpiling fly ash during periods of low demand is often advantageous.

By mixing fly ash with water to a water content of about 10%, an environmentally safe "conditioned fly ash" mixture is created. AFter being exposed to ambient conditions, the mixture becomes pebble-like. However, when fly ash is needed for sludge disposal in accordance with the present invention, this pebble-like mixture can be crushed and used with small quantities of dry fly ash or a calcium containing activator, and the result will be equally as effective as when conventional dry fly ash is used.

When the stockpiled conditioned fly ash is used according to the wasting process and system of this invention, the conditioned fly ash is crushed and transferred by a fourth conveyor belt 28 to the process facility and fed into the primary pugmill 16. The same mixing process will take place between the sludge and conditioned fly ash as described above using non-conditioned fly ash.

The secondary pugmill 20 serves as a backup for the primary pugmill 16 or can also be used to provide additional wasting capacity as required, functioning in the same manner as the primary pugmill. The third conveyor belt 26 can be used to transfer the final mixture of fly ash and sludge from the secondary pugmill to a stockpile area where it is transferred to dump trucks. Consequently, both the first and third conveyor belts 18 and 26 are capable of transferring the fly ash-sludge mixture to stockpiles.

The fly ash-sludge mixture end product is taken by dump trucks from the stockpiles to a landfill. The piles can be handled by conventional earth moving equipment when the fly ash hydration reaction has reached the point that the material can support such traffic.

To establish the types of fly ash which would be appropriate for the method and product of this invention, experiments were done on numerous types of fly ash, including fly ash taken from: 1. Commonwealth Edison Co.'s Waukegan, Ill. Power Station; 2. Wisconsin Electric's Pleasant Prairie Station; 3. American Fly Ash's Romeoville, Ill. ash conditioning plant; and 4. a 1:1 mix by weight of Pleasant Prairie ash and Romeoville ash. Sludge was taken from the North Short Sanitary District located in Gurnee, Ill.

Numerous laboratory tests were performed on the fly ash-sludge mixtures, including measurements of unit weight, moisture content, strength and permeability. The tests were performed in two phases, the first was to determine the range of mix ratios of sludge and fly ash which could provide an acceptable material for landfilling, and the second was to provide more detailed information on those mixes which appeared to be acceptable according to the first phase of testing.

The testing program included time intervals of 0, 1, 3 and 7 days between mixing and compaction. Strength tests were performed 1, 7 or 28 days after compaction by unconfined compression testing. Direct shear testing and triaxial compression testing were also performed where appropriate.

The laboratory test results show that the physical properties of the sludge and fly ash mixtures are a function of ash type (either Class C or Class F as determined by standard ASTM testing procedures), mix ratio, and curing time. All of the mixes tested produced a material suitable for use in a self-supporting fill. Wet densities of the mixture, when compacted to approximately 90% of ASTM D 698, ranged from 75.5 pounds per cubic foot (pcf) to as high as 104.8 pcf. Compactibility of each mixture was eventually achieved on all samples. Some mixes required curing times prior to compaction approaching one week due to the presence of free water in the sample. Once free water was adequately reduced, a continued delay in compaction was generally detrimental to achieving great densities. The mixture compaction data are presented below in Table 1.

TABLE 1

| MIX RATIO | DAYS CURED UNCOMPACTED | | | |
|---|---|---|---|---|
| | 0 | 1 | 3 | 7 |
| WET DENSITY OF COMPACTED 100% WAUKEGAN FLY ASH/SLUDGE | | | | |
| 1.5:1 | 100.0 | 100.0 | 99.2 | 103.4 |
| 2.0:1 | 103.7 | 106.7 | 104.6 | 101.4 |
| 2.25:1 | 103.9 | 107.0 | 105.5 | 104.4 |
| 2.5:1 | 106.0 | 105.8 | 104.6 | 98.4 |
| 3.0:1 | 112.4 | 100.6 | 97.8 | 91.5 |
| WET DENSITY OF COMPACTED 100% CONDITIONED CRUSHED ROMEOVILLE FLY ASH/SLUDGE | | | | |
| 1.5:1 | 92.5 | 93.6 | 95.7 | 103.4 |
| 2.0:1 | 96.8 | 96.3 | 98.2 | 101.4 |
| 2.5:1 | 102.1 | 101.4 | 101.5 | 104.4 |
| 3.0:1 | 102.3 | 102.8 | 102.7 | 98.4 |
| 4.0:1 | 103.0 | 102.4 | 100.9 | 91.5 |
| WET DENSITY OF COMPACTED 100% PLEASANT PRAIRIE FLY ASH/SLUDGE | | | | |
| 1.0:1 | 93.4 | 95.8 | 96.8 | 85.0 |
| 1.5:1 | 96.6 | 90.5 | 86.0 | 74.5 |
| 2.0:1 | 98.9 | 89.1 | 83.4 | 80.8 |
| 2.5:1 | 90.7 | 83.8 | 81.4 | 75.5 |
| 3.0:1 | 88.2 | 82.1 | 79.6 | 76.7 |
| WET DENSITY OF COMPACTED 50% PLEASANT PRAIRIE, 50% CONDITIONED CRUSHED ROMEOVILLE FLY ASH/SLUDGE | | | | |
| 1.0:1 | 92.6 | 92.6 | 92.2 | 94.5 |
| 1.5:1 | 99.6 | 99.2 | 96.9 | 86.1 |
| 2.0:1 | 104.8 | 96.9 | 95.1 | 91.4 |
| 2.5:1 | 99.2 | 91.1 | 86.9 | 81.1 |
| 3.0:1 | 92.3 | 87.0 | 84.6 | 80.5 |

Notes:
1) Results presented as wet density in pounds per cubic foot immediately after compaction by Harvard miniature compaction device.
2) Boxed values indicate mix could not sustain full compactive effort of Harvard miniature compaction device.

Strength values for the mixtures varied greatly and sometimes exceeded 5000 pounds per square foot (psf) (See Table 2). Some of the mixes that exhibited low unconfined compression strengths were retested using direct shear and triaxial testing. These tests indicated angles of internal shear and triaxial testing. Shear tests indicate angles of internal friction in excess of 35 degrees. Direct shear testing was required because the material in some mixes was insufficiently cohesive. Triaxial testing was performed in the second phase testing to assess the effective stress properties. The results of all strength testing are presented below in Table 2.

TABLE 2

| NUMBER OF DAYS CURED UNCOMPACTED | NUMBER OF DAYS CURED COMPACTED | AS TESTED | | | | |
|---|---|---|---|---|---|---|
| | | MOISTURE PERCENT DRY WEIGHT | DENSITY PCF DRY BASIS | DENSITY PCF WET BASIS | SHEAR[a] STRENGTH PSF | PERCENT STRAIN |
| 100% WAUKEGAN FLY ASH/SLUDGE 1.0:1 | | | | | | |
| 0 | 7 | 58.9 | 58 | 92 | 1387 | 2.8 |
| | 28 | 49.1 | 59 | 88 | 3256 | 3.2 |
| | 28 | 55.7$_i$/60.6$_f$ | 56$_i$/64$_f$ | 87$_i$/103$_f$ | 2109[b] | 2.0 |
| 100% WAUKEGAN FLY ASH/SLUDGE 1.5:1 | | | | | | |
| 0 | 1 | 45.1 | 67 | 97 | 804 | 10.0 |
| | 7 | 44.6 | 68 | 98 | 1436 | 7.9 |
| | 28 | 44.3 | 67 | 97 | 1793 | 4.9 |
| 1 | 1 | 41.5 | 69 | 97 | 673 | 7.2 |
| | 7 | 42.2 | 69 | 98 | 751 | 6.7 |
| | 28 | 40.6 | 70 | 98 | 1069 | 3.9 |
| 3 | 1 | 39.4 | 72 | 101 | 880 | 8.3 |
| | 7 | 37.6 | 73 | 100 | 686 | 3.0 |
| | 28 | 39.9 | 68/71 | 95/98 | av. 1796 | 3.1 |
| 7 | 1 | 33.0 | 73 | 97 | 694 | 2.5 |
| | 7 | 33.3 | 74 | 98 | 1099 | 2.98 |
| | 28 | 32.6 | 74 | 98 | 847 | 2.4 |
| 0 | 7 | 45.1 | 68 | 99 | 1619 | 4.3 |
| | 28 | 66.6 | 67 | 96 | 2160 | 2.8 |

TABLE 2-continued

| NUMBER OF DAYS CURED UNCOMPACTED | NUMBER OF DAYS CURED COMPACTED | AS TESTED | | | SHEAR[a] STRENGTH PSF | PERCENT STRAIN |
|---|---|---|---|---|---|---|
| | | MOISTURE PERCENT DRY WEIGHT | DENSITY PCF DRY BASIS | DENSITY PCF WET BASIS | | |
| | 28 | 43.4$_i$/47.7$_f$ | 66$_i$/71$_f$ | 95$_i$/105$_f$ | 2719[b] | 10.0 |
| 100% WAUKEGAN FLY ASH/SLUDGE 2.0:1 | | | | | | |
| 0 | 1 | 34.1 | 75 | 101 | 1380 | 6.4 |
| | 7 | 33.7 | 76 | 101 | 1787 | 4.0 |
| | 28 | 33.8 | 77 | 103 | 2727 | 3.1 |
| 1 | 1 | 33.5 | 74 | 99 | 854 | 2.5 |
| | 7 | 32.7 | 78 | 103 | 1408 | 2.6 |
| | 28 | 31.1 | 78 | 103 | 2642 | 2.0 |
| 3 | 1 | 31.5 | 69 | 91 | 372 | 2.0 |
| | 7 | 30.8 | 73 | 95 | 624 | 1.3 |
| | 28 | 30.4 | 79 | 104 | 4144 | 2.5 |
| 7 | 1 | 26.6 | 73 | 92 | 836 | 4.6 |
| | 7 | 33.8 | 77 | 103 | 1313 | 6.4 |
| | 28 | 25.9 | 80 | 100 | 2803 | 2.1 |
| 100% WAUKEGAN FLY ASH/SLUDGE 2.25:1 | | | | | | |
| 0 | 1 | 29.3 | 83 | 107 | 1851 | 4.9 |
| | 7 | 29.2 | 84 | 108 | 2647 | 3.3 |
| | 28 | 29.0 | 83 | 107 | av. 3802 | 3.1 |
| 1 | 1 | 30.0 | 81 | 105 | 1131 | 5.2 |
| | 7 | 29.8 | 81 | 105 | 1232 | 2.5 |
| | 28 | 29.7 | 79 | 102 | 1938 | 2.5 |
| 3 | 1 | 28.7 | 71 | 92 | 376 | 1.9 |
| | 7 | 28.7 | 73 | 94 | 416 | 1.3 |
| | 28 | 27.3 | 82 | 105 | 5407 | 2.1 |
| 7 | 1 | 26.0 | 79 | 100 | 878 | 1.3 |
| | 7 | 25.1 | 77 | 96 | 585 | 2.2 |
| | 28 | 24.4 | 84 | 104 | 6359 | 1.4 |
| 100% WAUKEGAN FLY ASH/SLUDGE 2.50:1 | | | | | | |
| 0 | 1 | 22.1 | 90 | 110 | 4592 | 4.4 |
| | 7 | 23.1 | 88 | 108 | 5062 | 1.5 |
| | 28 | 23.8 | 85 | 105 | 5315 | 2.0 |
| 1 | 1 | 26.6 | 68 | 86 | 229 | 1.2 |
| | 7 | 26.3 | 80 | 101 | 1180 | 2.8 |
| | 28 | 26.9 | 80 | 101 | 1354 | 3.7 |
| 3 | 1 | 23.8 | 76 | 94 | 662 | 1.8 |
| | 7 | 23.5 | 75 | 94 | 629 | 1.8 |
| | 28 | 23.3 | 84/80 | 104/99 | av. 3845 | — |
| 7 | 1 | 22.8 | 75 | 92 | 1019 | 1.3 |
| | 7 | 25.3 | 70 | 88 | 728 | 1.2 |
| | 28 | 22.5 | 75 | 92 | 1513 | 2.1 |
| 100% WAUKEGAN FLY ASH/SLUDGE 3.00:1 | | | | | | |
| 0 | 1 | 22.9 | 80 | 98 | 3980 | 0.74 |
| | 7 | 21.4 | 81 | 98 | 4891 | 1.3 |
| | 28 | 21.6 | 83 | 100 | 2961/6788 | 1.4/1/8 |
| 1 | 1 | 20.2 | 80 | 97 | 744 | 2.5 |
| | 7 | 20.6 | 78 | 94 | 696 | 2.8 |
| | 28 | 22.9 | 75 | 93 | 791 | 2.2 |
| 3 | 1 | 18.6 | 80 | 94 | 849 | 3.1 |
| | 7 | 18.7 | 80 | 95 | 2250 | 2.0 |
| | 28 | 18.1 | 81 | 95 | 1673 | 0.7 |
| 7 | 1 | 15.1 | 79 | 91 | 695 | 1.4 |
| | 7 | — | — | — | — | — |
| | 28[d] | — | — | — | — | — |
| 100% CONDITIONED CRUSHED ROMEOVILLE FLY ASH/SLUDGE 1.0:1 | | | | | | |
| 0 | 7 | 83.6 | 48 | 88 | 312 | 8.2 |
| | 28 | 80.7 | 49 | 89 | 376 | 10.4 |
| | 28 | 79.1$_i$/63.1$_f$ | 50$_i$/76$_f$ | 89.8$_i$/124$_f$ | 1617[c] | 8.1 |
| 0[c] | 0 | — | — | 83.9 | — | — |
| 100% CONDITIONED CRUSHED ROMEOVILLE FLY ASH/SLUDGE 1.5:1 | | | | | | |
| 0 | 1 | 62.7 | 58 | 94 | 197 | 10.0 |
| | 7 | 64.1 | 57 | 94 | 182 | 10.0 |
| | 28 | 64.7 | 57 | 93 | av. 233 | 10.0 |
| 1 | 1 | 61.7 | 59 | 95 | 171 | 10.0 |
| | 7 | 61.9 | 61 | 98 | 159 | 10.0 |
| | 28 | 62.3 | 58 | 94 | 121 | 10.0 |
| 3 | 1 | 61.5 | 59 | 95 | 190 | 10.0 |
| | 7 | 62.5 | 59 | 95 | 166 | 14.6 |
| | 28 | 61.3 | 59 | 95 | 219 | 10.0 |
| 7 | 1 | 56.4 | 63 | 98 | 186 | 10.0 |
| | 7 | 34.9 | 72 | 97 | 291 | 11.5 |

TABLE 2-continued

| NUMBER OF DAYS CURED UNCOMPACTED | NUMBER OF DAYS CURED COMPACTED | AS TESTED | | | SHEAR[a] STRENGTH PSF | PERCENT STRAIN |
| | | MOISTURE PERCENT DRY WEIGHT | DENSITY PCF DRY BASIS | DENSITY PCF WET BASIS | | |
| --- | --- | --- | --- | --- | --- | --- |
| | 28 | 56.3 | 62 | 97 | 570 | 8.2 |
| 0 | 7 | 63.4 | 58 | 95 | 315 | 7.5 |
| | 28 | 58.3 | 62 | 98 | 474 | 7.9 |
| | 28 | 67.9$_i$/56.6$_f$ | 57$_i$/95$_f$ | 96$_i$/149$_f$ | 1733[b] | 10.0 |
| 0[d] | 0 | — | — | 54.6 | — | — |
| 100% CONDITIONED CRUSHED ROMEOVILLE FLY ASH/SLUDGE 2.0:1 | | | | | | |
| 0 | 1 | 55.1 | 61 | 94 | 316 | 6.4 |
| | 7 | 53.3 | 62 | 94 | 237 | 9.1 |
| | 28 | 55.1 | 61 | 94 | 290 | 10.0 |
| 1 | 1 | 51.0 | 63 | 95 | 271 | 7.9 |
| | 7 | 54.1 | 64 | 99 | 192 | 8.7 |
| | 28 | 49.5 | 66 | 98 | 197 | 10.0 |
| 3 | 1 | 51.6 | 64 | 97 | 307 | 8.8 |
| | 7 | 53.1 | 64 | 97 | 220 | 10.0 |
| | 28 | 49.9 | 65 | 97 | 272 | — |
| 7 | 1 | 39.2 | 73 | 102 | 493 | 5.5 |
| | 7 | 39.8 | 74 | 103 | 640 | 4.5 |
| | 28 | — | — | — | — | — |
| 100% CONDITIONED CRUSHED ROMEOVILLE FLY ASH/SLUDGE 2.5:1 | | | | | | |
| 0 | 1 | 48.4 | 63 | 94 | 394 | 2.5 |
| | 7 | 46.7 | 65 | 96 | 330 | 4.5 |
| | 28 | 47.9 | 65 | 96 | 286 | 5.7 |
| 1 | 1 | 46.4 | 63 | 92 | 300 | 2.4 |
| | 7 | 44.8 | 67 | 97 | 311 | 4.0 |
| | 28 | 42.8 | 68 | 96 | 357 | 5.8 |
| 3 | 1 | 44.8 | 70 | 100 | 501 | 7.8 |
| | 7 | 45.0 | 65 | 94 | 136 | 2.0 |
| | 28 | 43.5 | 66 | 94 | 511 | 4.6 |
| 7 | 1 | 34.5 | 75 | 101 | 991 | 2.8 |
| | 7 | 35.9 | 76 | 103 | 1156 | 2.8 |
| | 28 | 34.7 | 76 | 103 | 2254 | 1.8 |
| 100% CONDITIONED CRUSHED ROMEOVILLE FLY ASH/SLUDGE 3.0:1 | | | | | | |
| 0 | 1 | 43.2 | 69 | 99 | 459 | 2.7 |
| | 7 | 41.3 | 71 | 101 | 376 | 4.0 |
| | 28 | 40.2 | 70 | 98 | 378 | 5.5 |
| 1 | 1 | 41.3 | 68 | 96 | 246 | 2.5 |
| | 7 | 42.3 | 68 | 96 | 481 | 2.5 |
| | 28 | 42.3 | 69 | 98 | 235 | 2.3 |
| 3 | 1 | 40.2 | 71 | 100 | 441 | 5.6 |
| | 7 | 43.1 | 68 | 97 | 259 | 2.2 |
| | 28 | 42.2 | 71 | 101 | 727 | 3.9 |
| 7 | 1 | 37.9 | 71 | 97 | 412 | 2.2 |
| | 7 | 38.0 | 73 | 100 | 458 | 3.7 |
| | 28 | 38.0 | 76 | 105 | 1544 | 2.8 |
| 100% CONDITIONED CRUSHED ROMEOVILLE FLY ASH/SLUDGE 4.0:1 | | | | | | |
| 0 | 1 | 37.6 | 62 | 85 | 154 | 1.5 |
| | 7 | 37.3 | 71 | 97 | 287 | 2.5 |
| | 28 | 36.2 | 69 | 93 | 552 | 4.4 |
| 1 | 1 | 36.4 | 66 | 90 | 266 | 1.3 |
| | 7 | 37.2 | 62 | 85 | 85 | 8.4 |
| | 28 | 36.2 | 69 | 93 | 274 | 1.5 |
| 3 | 1 | 34.6 | 61 | 82 | 132 | 1.7 |
| | 7 | 35.2 | 69 | 93 | 251 | 2.3 |
| | 28 | 35.0 | 75 | 101 | 1753 | 1.8 |
| 7 | 1 | 30.2 | 73 | 95 | 383 | 2.2 |
| | 7 | 29.8 | 72 | 94 | 420 | 2.2 |
| | 28 | 30.3 | 76 | 99 | 2338 | 1.8 |
| 100% PLEASANT PRAIRIE FLY ASH/SLUDGE 0.5:1 | | | | | | |
| 0 | 7 | 94.2 | 43 | 83 | 891 | 2.9 |
| | 28 | 103.6 | 39 | 79 | 773 | 3.5 |
| | 28 | 100.5$_i$/104.2$_f$ | 39$_i$/47$_f$ | 77$_i$/97$_f$ | 1293[b] | 0.9 |
| 100% PLEASANT PRAIRIE FLY ASH/SLUDGE 1.0:1 | | | | | | |
| 0 | 1 | 53.8 | 60 | 92 | 2265 | 2.2 |
| | 7 | 48.5 | 63 | 94 | 3426 | 7.6 |
| | 28 | 51.1 | 61 | 93 | 2262 | 4.6 |
| 1 | 1 | 52.0 | 61 | 93 | 1776 | 5.1 |
| | 7 | 51.7 | 59 | 90 | 2051 | 2.3 |
| | 28 | 53.3 | 62 | 95 | 2124 | 4.3 |
| 3 | 1 | 49.8 | 62 | 93 | 1760 | 2.4 |
| | 7 | 49.9 | 61 | 92 | 2167 | 3.1 |
| | 28 | 50.3 | 64 | 96 | 2918 | 3.6 |
| 7 | 1 | 42.6 | 53 | 84 | 1653 | 1.8 |
| | 7 | 42.2 | 60 | 86 | 2559 | 3.2 |

TABLE 2-continued

| NUMBER OF DAYS CURED UNCOMPACTED | NUMBER OF DAYS CURED COMPACTED | AS TESTED MOISTURE PERCENT DRY WEIGHT | DENSITY PCF DRY BASIS | DENSITY PCF WET BASIS | SHEAR[a] STRENGTH PSF | PERCENT STRAIN |
|---|---|---|---|---|---|---|
| | 28 | 37.9 | 63 | 87 | 4775 | 1.8 |
| 0 | 7 | 49.8 | 64 | 97 | 4051 | 2.1 |
| | 28 | 49.4 | 60 | 90 | 4368 | 2.1 |
| | 28 | 47.3$_i$/56.7$_f$ | 62$_i$/67$_f$ | 91$_i$/106$_f$ | 4681[b] | 8.8 |
| 0[d] | 0 | — | — | 92.5 | — | — |
| | | 100% PLEASANT PRAIRIE FLY ASH/SLUDGE 1.5:1 | | | | |
| 0 | 1 | 37.5 | 71 | 97 | 4924 | 1.3 |
| | 7 | 33.6 | 74 | 99 | 8658 | 1.6 |
| | 28 | 33.2 | 72 | 96 | 5128 | 1.4 |
| 1 | 1 | 34.4 | 68 | 92 | 2192 | 1.8 |
| | 7 | 34.0 | 69 | 92 | 2298 | 1.9 |
| | 28 | 33.8 | 67 | 89 | 2454 | 1.6 |
| 3 | 1 | 33.1 | 65 | 87 | 1515 | 1.2 |
| | 7 | 32.4 | 68 | 90 | av. 2299 | — |
| | 28 | 32.5 | 66 | 88 | 2466 | 2.1 |
| 7 | 1 | 18.8 | 69 | 82 | 1344[e] | — |
| | 7 | 13.9 | 69 | 79 | 1978[e] | — |
| | 28 | 14.0 | 66 | 76 | 1128 | — |
| 0 | 7 | 40.1 | 73 | 103 | 5211 | 2.8 |
| | 28 | 38.3 | 71 | 98 | 7548 | 2.1 |
| | 28 | 40.5$_i$/46.7$_f$ | 70.9$_i$/96$_f$ | 98$_i$/141$_f$ | 7455[c] | 2.9 |
| 0[d] | 0 | — | — | 89.4 | — | — |
| | | 100% PLEASANT PRAIRIE FLY ASH/SLUDGE 2.0:1 | | | | |
| 0 | 1 | 27.5 | 78 | 99 | 10406 | 2.9 |
| | 7 | 22.7 | 86 | 105 | 7930 | 2.8 |
| | 28 | 28.0 | 77 | 98 | 4947 | 2.8 |
| 3 | 1 | 22.4 | 66 | 81 | 854[e] | — |
| | 7 | 24.6 | 77 | 96 | 874[e] | 2.3 |
| | 28 | 21.6 | 67 | 81 | 1387[e] | — |
| 7 | 1 | 20.2 | 68 | 82 | 1051[e] | — |
| | 7 | 12.1 | 70 | 78 | 960[e] | — |
| | 28 | 6.6 | 65 | 70 | 1594 | — |
| | | 100% PLEASANT PRAIRIE FLY ASH/SLUDGE 2.5:1 | | | | |
| 0 | 1 | 19.6 | 75 | 90 | 3167 | 1.4 |
| | 7 | 17.8 | 89 | 105 | 6946 | 1.9 |
| | 28 | 20.4 | 87 | 105 | 5501 | — |
| 1 | 1 | 20.2 | 68 | 82 | 1851 | 3.2 |
| | 7 | 17.8 | 72 | 84 | 2237 | 3.3 |
| | 28 | 14.9 | 71 | 82 | 2909[e] | — |
| 3 | 1 | 16.9 | 70 | 81 | 955[e] | — |
| | 7 | 21.4 | 68 | 83 | 1162[e] | — |
| | 28 | 16.5 | 70 | 82 | 1848 | — |
| 7 | 1 | 14.0 | 69 | 79 | 1094[e] | — |
| | 7 | 7.6 | 70 | 75 | 2074[e] | — |
| | 28 | 5.8 | 71 | 75 | 1531 | — |
| | | 100% PLEASANT PRAIRIE FLY ASH/SLUDGE 3.0:1 | | | | |
| 0 | 1 | 15.9 | 86 | 100 | 30652 | 2.1 |
| | 7 | 14.7 | 84 | 97 | 11609 | 2.6 |
| | 28 | 18.6 | 74 | 89 | 5259 | — |
| 1 | 1 | 16.9 | 68 | 79 | 1579 | — |
| | 7 | 13.6 | 73 | 83 | 1473 | 2.4 |
| | 28 | 15.1 | 71 | 82 | 2436 | 1.8 |
| 3 | 1 | 15.0 | 74 | 85 | 1579[e] | — |
| | 7 | 13.2 | 71 | 81 | 1872[e] | — |
| | 28 | 14.9 | 74 | 85 | 422[e] | — |
| 7 | 1 | 14.0 | 65 | 74 | 1109[e] | — |
| | 7 | 8.9 | 70 | 76 | 792[e] | — |
| | 28 | 5.9 | 66 | 70 | 696 | — |
| | | 50% PLEASANT PRAIRIE, 50% CONDITIONED CRUSHED ROMEOVILLE FLY ASH/SLUDGE 1.0:1 | | | | |
| 0 | 1 | 62.4 | 56 | 91 | 1250 | 2.4 |
| | 7 | 56.7 | 58 | 92 | 1230 | 3.9 |
| | 28 | 27.3 | 72 | 92 | 4257 | — |
| 1 | 1 | 66.7 | 56 | 93 | 604 | 4.4 |
| | 7 | 66.1 | 55 | 91 | 719 | 3.1 |
| | 28 | 66.5 | 54 | 92 | 897 | 4.9 |
| 3 | 1 | 65.8 | 58 | 96 | 549 | 5.5 |
| | 7 | 62.8 | 58 | 94 | 984 | 3.5 |
| | 28 | 67.3 | 51 | 85 | 878 | — |
| 7 | 1 | 55.7 | 59 | 92 | 1164 | 4.3 |
| | 7 | 53.2 | 62 | 95 | 1508 | 3.6 |
| | 28 | 53.2 | 61 | 93 | 1951 | 3.6 |
| 0 | 7 | 71.8 | 53 | 91 | 1426 | 3.6 |
| | 28 | 63.9 | 53 | 86 | 1757 | 3.2 |

TABLE 2-continued

| NUMBER OF DAYS CURED UNCOMPACTED | NUMBER OF DAYS CURED COMPACTED | AS TESTED | | | SHEAR[a] STRENGTH PSF | PERCENT STRAIN |
|---|---|---|---|---|---|---|
| | | MOISTURE PERCENT DRY WEIGHT | DENSITY PCF DRY BASIS | DENSITY PCF WET BASIS | | |
| | 28 | 68.2$_i$/73.5$_f$ | 52$_i$/59$_f$ | 88$_i$/103$_f$ | 2147[b] | 4.8 |
| 50% PLEASANT PRAIRIE, 50% CONDITIONED CRUSHED ROMEOVILLE FLY ASH/SLUDGE 2.5:1 | | | | | | |
| 0 | 1 | 35.3 | 74 | 100 | 1001 | 1.0 |
| | 7 | 32.4 | 75 | 99 | 5588 | 1.3 |
| | 28 | 48.8 | 66 | 99 | 2252 | 6.0 |
| 1 | 1 | 31.1 | 68 | 89 | 677 | 2.8 |
| | 7 | 31.3 | 64 | 84 | 825 | 3.0 |
| | 28 | 33.8 | 66 | 88 | 2273 | — |
| 3 | 1 | 30.2 | 73 | 95 | 581[e] | — |
| | 7 | 32.9 | 63 | 84 | 1176[e] | — |
| | 28 | 24.5 | 73 | 91 | 864[e] | — |
| 7 | 1 | 26.3 | 70 | 88 | 902[e] | — |
| | 7 | 21.5 | 69 | 83 | 1046[e] | — |
| | 28 | 16.6 | 70 | 81 | 3274 | — |
| 50% PLEASANT PRAIRIE, 50% CONDITIONED CRUSHED ROMEOVILLE FLY ASH/SLUDGE 3.0:1 | | | | | | |
| 0 | 1 | 27.5 | 73 | 94 | 1952 | 3.5 |
| | 7 | 26.5 | 73 | 92 | 3686 | 1.5 |
| | 28 | 65.5 | 55 | 92 | 1302 | 4.3 |
| 1 | 1 | 31.8 | 61 | 81 | 329 | 2.4 |
| | 7 | 24.3 | 63 | 78 | 988 | 2.3 |
| | 28 | 30.4 | 64 | 83 | 1558 | 1.9 |
| 3 | 1 | 26.6 | 76 | 96 | 898[e] | — |
| | 7 | 22.4 | 81 | 99 | 1627[e] | — |
| | 28 | 8.9 | 70 | 76 | 2515[e] | — |
| 7 | 1 | 20.8 | 70 | 84 | 1099[e] | — |
| | 7 | 13.7 | 71 | 80 | 1142[e] | — |
| | 28 | 6.2 | 69 | 73 | 2904[e] | — |
| 50% PLEASANT PRAIRIE, 50% CONDITIONED CRUSHED ROMEOVILLE FLY ASH/SLUDGE 1.5:1 | | | | | | |
| 0 | 1 | 53.5 | 61 | 93 | 1887 | 3.0 |
| | 7 | 29.9 | 73 | 95 | 2747 | 4.4 |
| | 28 | 32.2 | 74 | 98 | 4983 | — |
| 1 | 1 | 51.5 | 61 | 92 | 1148 | 2.7 |
| | 7 | 50.4 | 62 | 93 | 1811 | 3.6 |
| | 28 | 48.9 | 66 | 98 | 2336 | 3.9 |
| 3 | 1 | 49.2 | 61 | 92 | 1383 | 2.3 |
| | 7 | 47.8 | 58 | 86 | 1349 | 2.4 |
| | 28 | 48.9 | 65 | 96 | 2748 | 3.2 |
| 7 | 1 | 33.9 | 61 | 82 | 1341 | 1.4 |
| | 7 | 33.8 | 65 | 87 | 2778 | 2.1 |
| | 28 | 35.9 | 63 | 85 | 2569 | 2.5 |
| 0 | 7 | 50.1 | 65 | 98 | 3156 | 3.6 |
| | 28 | 50.5 | 64 | 96 | 3477 | 3.5 |
| | 28 | 52.6$_i$/57.9$_f$ | 62$_i$/85$_f$ | 95$_i$/134$_f$ | 4492[b] | 4.7 |
| 50% PLEASANT PRAIRIE, 50% CONDITIONED CRUSHED ROMEOVILLE FLY ASH/SLUDGE 2.0:1 | | | | | | |
| 0 | 1 | 41.2 | 71 | 100 | 3326 | 2.0 |
| | 7 | 56.4 | 64 | 101 | 4674 | 2.7 |
| | 28 | 35.9 | 76 | 103 | 5417 | 2.8 |
| 1 | 1 | 37.8 | 69 | 95 | 1712 | 1.4 |
| | 7 | 38.9 | 66 | 92 | 1494 | 3.1 |
| | 28 | 36.2 | 71 | 96 | 2703 | 2.1 |
| 3 | 1 | 38.4 | 67 | 93 | 1127 | 1.8 |
| | 7 | 35.8 | 69 | 94 | 1920 | 1.8 |
| | 28 | 36.7 | 68 | 93 | 2571 | 1.8 |
| 7 | 1 | 35.5 | 67 | 90 | 1144 | 2.5 |
| | 7 | 33.1 | 69 | 91 | 2045 | 1.8 |
| | 28 | 32.9 | 67 | 89 | 2114 | 2.8 |

[a]Determined by unconfined compression test unless noted otherwise.
[b]Triaxial-consolidated-undrained test with confining pressure = 2304 psf.
[c]No test possible sample crumbled during extruding.
[d]Density determined from Drop Test.
[e]Strength determination by direct shear test.
Note:
Moisture content values measured at the time of strength testing.
i = initial moisture content prior to consolidation.
f = final moisture content subsequent to test.

Mixtures of fly ash and sludge initially were found to form a soil-like material with granular properties. The mixtures derived their strengths by chemical reactions which ultimately caused the soil-like mixtures to form a rock-like material after exposure to typical ambient conditions. This rock-like consistency resulted from the cementious properties within the fly ash when combined with moisture typically furnished by the sludge. The solids in the sludge do not appear to significantly affect this hydration reaction.

All of the mixtures resulted in materials suitable for a self-supporting landfill. Mixtures of sludge and fly ash produce a granular type material with high concentrations of sludge and produce a rock-like material with high concentrations of fly ash, assuming sufficient water is available from the sludge to initiate the fly ash cementing process.

Permeability tests were performed on samples of fly ash-sludge mixtures in conjunction with triaxial strength pressures. Permeabilities were measured at two confining pressures. The tests showed permeability values ranging from about $5 \times (10)-6$ to about $1 \times (10)-7$ cm/sec. The permeability test results are presented below in Table 3.

To estimate the life span of the landfill, the volume of fly ash-sludge to be disposed versus time was evaluated. Because of the variability of the unit weight of sludge due to air entrapment, the comparison was made assuming the sludge was fully saturated. The volumes of the constituent materials were then calculated and compared with the observed unit weights of the mixtures. These comparisons show that the volume of the mixtures is less than the volume of the constituent material.

TABLE 3

| MIX RATIO FLY ASH TO SLUDGE | INITIAL DRY DENSITY (pcf) | CONFINING PRESSURE (psf) | K COEFFICIENT OF PERMEABILITY (cm/sec) | FINAL DRY DENSITY (pcf) | CONFINING PRESSURE (psf) | K COEFFICIENT OF PERMEABILITY (cm/sec) |
| --- | --- | --- | --- | --- | --- | --- |
| 100% WAUKEGAN FLY ASH/SLUDGE | | | | | | |
| 1.0 | 61 | 72 | $2.7 \times 10^{-7}$ | 64 | 2304 | $1.6 \times 10^{-7}$ |
| 1.5 | 69 | 72 | $6.5 \times 10^{-7}$ | 71 | 2304 | $3.7 \times 10^{-7}$ |
| 100% CONDITIONED CRUSHED ROMEOVILLE FLY ASH/SLUDGE | | | | | | |
| 1.0 | 60 | 72 | $8.3 \times 10^{-7}$ | 76 | 2304 | $1.1 \times 10^{-7}$ |
| 1.5 | 65 | 72 | $9.3 \times 10^{-7}$ | 95 | 2304 | $2.4 \times 10^{-7}$ |
| 100% PLEASANT PRAIRIE FLY ASH/SLUDGE | | | | | | |
| 0.5 | 39 | 72 | not recorded | 47 | 2304 | $3.0 \times 10^{-6}$ |
| 1.0 | 65 | 72 | $5.9 \times 10^{-6}$ | 67 | 2304 | $1.8 \times 10^{-6}$ |
| 1.5 | 75 | 72 | $3.7 \times 10^{-7}$ | 96 | 2304 | $4.2 \times 10^{-7*}$ |
| 50% PLEASANT PRAIRIE, 50% CONDITIONED CRUSHED ROMEOVILLE FLY ASH/SLUDGE | | | | | | |
| 1.0 | 57 | 144 | $4.1 \times 10^{-7}$ | 59 | 2304 | $2.6 \times 10^{-7}$ |
| 1.5 | 77 | 144 | $4.7 \times 10^{-7}$ | 85 | 2304 | $2.7 \times 10^{-7}$ |

*Value may not be representative.

EP toxicity tests were performed on four samples. The analysis consisted of 100 grams of mixture comprising 1.5 parts fly ash to 1 part sludge. Each sample consisted of one of the four different types of fly ash in order to cover the range of ash characteristics that might be mixed and landfilled at the site. Parameters analyzed included organic compounds and metals listed in Table 4.

Regarding the disposal site, run-on water from surface drainage is preferably controlled by perimeter ditching during initial development. Surface water resulting from run-off of the exposed surface is preferably controlled by ditches and pumped to a holding pond for use in the ash conditioning process conducted at the site, or for on-site dust control.

In the preferred embodiment, the average depth of

TABLE 4

| PARAMETER | DETECTION LIMIT (mg/L) | CONCENTRATION (mg/L) | | | | RCRA STANDARD (mg/L) |
| --- | --- | --- | --- | --- | --- | --- |
| | | WAUKEGAN FLY ASH | PLEASANT PRAIRIE FLY ASH | ROMEOVILLE FLY ASH | PLEASANT PRAIRIE AND ROMEOVILLE FLY ASH | |
| Endrin | 0.0002 | BDL | BDL | BDL | BDL | 0.02 |
| Lindane | 0.004 | BDL | BDL | BDL | BDL | 0.4 |
| Toxaphene | 0.005 | BDL | BDL | BDL | BDL | 0.5 |
| Methoxychlor | 0.1 | BDL | BDL | BDL | BDL | 10.0 |
| 2,4-D | 0.1 | BDL | BDL | BDL | BDL | 10.0 |
| 2,4,5-TP (Silvex) | 0.01 | BDL | BDL | BDL | BDL | 1.0 |
| Arsenic | 0.05 | BDL | BDL | BDL | BDL | 5.0 |
| Barium | 1.0 | 7.0 | 3.7 | 4.0 | 6.5 | 100.0 |
| Cadmium | 0.02 | 0.02 | 0.1 | 0.06 | 0.03 | 1.0 |
| Chromium | 0.1 | 0.16 | 0.25 | 0.13 | 0.16 | 5.0 |
| Lead | 0.2 | BDL | BDL | BDL | BDL | 5.0 |
| Mercury | 0.0002 | 0.001 | 0.0006 | 0.0005 | 0.0005 | 0.2 |
| Selenium | 0.05 | BDL | BDL | BDL | BDL | 1.0 |
| Silver | 0.06 | BDL | BDL | BDL | BDL | 5.0 |
| Beryllium | 0.02 | BDL | BDL | BDL | BDL | — |
| Copper | 0.1 | 0.56 | 0.19 | 0.15 | 0.17 | — |
| Iron | 1.0 | 8.4 | 28 | 10 | 22 | — |
| Manganese | 0.5 | BDL | 4.0 | 9.2 | 0.98 | — |
| Nickel | 0.1 | 0.26 | 0.59 | 0.52 | 0.4 | — |
| Zinc | 0.02 | BDL | 2.5 | 0.77 | 0.12 | — |

*1.5 parts fly ash (four sources as shown) to 1 part sludge.
Notes:
BDL = below detection limit.
— = not applicable.

The results of the toxicity tests indicate that any contamination of the environment due to the fly ash and sludge mixture will be well below the limits established under the Resource Conservation and Recovery Act for classifying wastes as hazardous (see Table 4).

the planned excavation is about 20 feet below ground level, and the average maximum fill height is about 60 feet above ground level. These dimensions typically accommodate construction activities, as well as surface drainage during filling and also after completion. Such a fill is significantly less land consumptive and more economical than other known disposal systems which require large volumes of water, or which are not adapted to both above and below grade disposal.

A section of the landfill should preferably be completed each year using the method of this invention, and thereafter a clay cover and topsoil is preferably placed and vegetative cover planted during the growing season. Daily cover is typically not required because the end product of this method does not lend itself to blowing debris and will not attract rodents and the like.

Prior to disposal start-up, the bottom and side walls of the disposal site preferably comprise about 10 feet of clay, preferably having a maximum permeability of $1 \times (10)-7$ cm/sec.

Municipal sewage sludges have varying water content. In some systems, water content can be as high as 97%, while sewage sludge from other systems may have water content of 75% or less. Therefore, the percentage of additives needed to stabilize sewage sludge depends to some extent on the water content of the sludge being treated. Similarly, the FBCR obtained from different sources will vary. This can be seen in Table 5. Some FBCR contains large amounts of fly ash, while other FBCR will contain little fly ash. For purposes of the present invention, therefore, it will be assumed that large variations will occur in the compositions of the materials referred to as FBCR and sewage sludge.

the sludge. The activators can be pre-mixed with each other in a dry state to form a single additive to be mixed with the sludge. The blended additive can range from about 1% to 99% FBCR, and from 99% to 1% fly ash.

The additive and sludge should be mixed so that the additive comprises between about 65% and about 90% (by weight, including water) of the final mixture. Without significant delay, the mixture should be stockpiled or placed in storage facilities or insulated in a manner such that the internal temperature of the mixture can be held at above 100° F. for a period of 72 hours. The heat produced by chemical reactions in the mixture kills bacteria and other pathogens in the sewage sludge. The heat necessary for sterilization, and to some extent drying, is generated by combination of the following exothermic reactions:

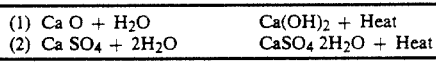

Any desired temperature below 212° F. can be achieved by proper proportioning of the blend of additives used. Higher temperatures are more effective at destroying pathogens and thereby can proportionally reduce the time required for the sterilization.

The mixture of the present invention is effective in substantially eliminating bacterial activity in typical municipal sewage sludge. Furthermore, the pH of the

TABLE 5

FLUIDIZED BED COMBUSTION RESIDE CHEMICAL ANALYSIS (ASTM C114)

| SOURCE | SAMPLE | SiO2 | Al2O3 | Fe2O3 | CaO | MgO | Na2O | H2O | SO3 | Moisture | LOI | Carbon | Total |
|---|---|---|---|---|---|---|---|---|---|---|---|---|---|
| #1 | A | 32.91 | 3.28 | 4.48 | 42.30 | 1.11 | 0.05 | 0.32 | 5.42 | 0.07 | 14.27 | 9.48 | 104.21 |
| #1 | B | 34.16 | 3.63 | 4.27 | 36.70 | 1.06 | 0.99 | 0.27 | 5.50 | 0.21 | 13.45 | 10.26 | 100.24 |
| #2 | A | 5.52 | 1.01 | 1.01 | 61.90 | 1.26 | 0.03 | 0.09 | 25.63 | 0.42 | 2.27 | 1.75 | 99.14 |
| #2 | B | 3.11 | 0.92 | 1.29 | 62.10 | 1.70 | 0.60 | 0.06 | 23.08 | 0.17 | 1.08 | 1.00 | 94.11 |
| #3 | A | 17.68 | 6.25 | 3.54 | 49.43 | 1.21 | 0.09 | 0.80 | 9.39 | 0.34 | 8.44 | 0.48 | 97.17 |
| #3 | B | 9.78 | 3.29 | 3.23 | 68.70 | 1.29 | 0.00 | 0.24 | 7.77 | 0.00 | 2.47 | 0.76 | 96.77 |
| #3 | C | 16.19 | 5.55 | 4.64 | 55.45 | 1.02 | 0.68 | 0.65 | 14.15 | 0.20 | 1.55 | 0.35 | 100.08 |
| #3 | D | 15.52 | 4.35 | 4.97 | 56.00 | 1.65 | 0.23 | 0.45 | 14.26 | 0.03 | 1.94 | 0.35 | 99.4 |

Fly ash produced by difficult plants may vary to some extent, particularly in the amount of calcium compounds contained therein (See Table 6). The term fly ash as used herein is intended to encompass a variety of finely divided ash residue collected from the exhaust of pulverized coal burning plants (including fly ash generated in fluidized bed boilers) and other fly ash not conforming to ASTM C618 specifications.

mixture is generally at a level of about 10.0 to 12.5, which is sufficient to prevent growth of residual bacteria, if any. As shown in Table 7, this material can maintain this alkalinity over longer periods of time. Lime kiln dust (LKD) has limited useful lifespan which apparently decreases after 6 days. This maintenance of alkalinity is essential to the stabilization of the heavy metals which may be contained in the sludge. The alka-

TABLE 6

TYPICAL FLY ASH CHEMISTRIES
ASTM C311

| SOURCE | SiO2 | Al2O3 | Fe2O3 | CaO | MgO | SO3 | Na2O | H2O | MOISTURE | LOI | CARBON | TOTAL |
|---|---|---|---|---|---|---|---|---|---|---|---|---|
| CINCINATTI OHIO | 52.32 | 24.67 | 15.02 | 1.38 | 1.28 | 0.62 | 0.45 | 2.39 | 0.36 | 1.46 | 1.30 | 99.95 |
| EVANSVILLE IND. | 39.05 | 19.11 | 5.69 | 25.38 | 5.33 | 2.01 | 2.22 | 0.43 | 0.15 | 0.09 | 0.05 | 99.46 |
| CHICAGO ILLINOIS | 56.81 | 15.31 | 6.03 | 10.26 | 3.20 | 0.98 | 5.38 | 0.53 | 0.19 | 0.30 | 0.18 | 98.99 |
| NASHVILLE TN. | 50.53 | 19.84 | 18.51 | 3.00 | 1.11 | 1.66 | 2.67 | 0.83 | 0.48 | 2.39 | 2.15 | 101.02 |
| GARY INDIANA | 35.45 | 17.60 | 5.20 | 16.47 | 4.41 | 2.85 | 1.57 | 0.84 | 2.85 | 12.39 | 11.84 | 99.63 |

In the method of the present invention, sewage sludge is transferred and metered into a pug mill. A rotary vane feeder is used to meter the activator with linity provides precipitation of the metals which produces stable insoluble compounds.

TABLE 7 pH OF SLUDGE MIXTURES OVER TIME (PER ASTM G-51)

| ACTIVATOR WITH SLUDGE | RATIO OF SLUDGE TO ACTIVATOR | DAY 1 11/30 | 12/1 | 12/2 | 12/5 | DAY 7 12/7 | |
|---|---|---|---|---|---|---|---|
| LKD | 4:1 | 10.1 | 10.5 | 10.5 | 10.3 | 9.9 | Decrease |
| LKD & FA | 3:1:1 | 10.4 | 9.9 | 10.3 | 10.7 | 10.7 | Stable |
| CKD | 4:1 | 11.5 | 10.8 | 11.4 | 11.5 | 11.4 | Stable |
| CKD & FA | 3:1:1 | 11.9 | 9.8 | 11.2 | 10.8 | 10.7 | Stable |
| Fly Ash | 4:1 | 10.9 | 12 | 11.4 | 11.1 | 11.2 | Stable |
| FBCR #1A & FA | 3:1:1 | 10.4 | 10.9 | 10.5 | 10.1 | 10.1 | Stable |
| FBCR #2B | 4:0:1 | 9.8 | 9.8 | 10.1 | 11 | 10.5 | Stable |
| FBCR #3 & FA | 3:1 | 10.5 | 10.7 | 10.9 | 10.5 | 10.4 | Stable |

It should be noted that if particularly high calcium fly ash is used, the need for FBCR may be reduced or eliminated. Similarly, if low calcium fly ash is used, greater amounts of FBCR may be required to achieve the chemical activity and resulting heat necessary to destroy pathogens in the sewage sludge.

Figure 3:
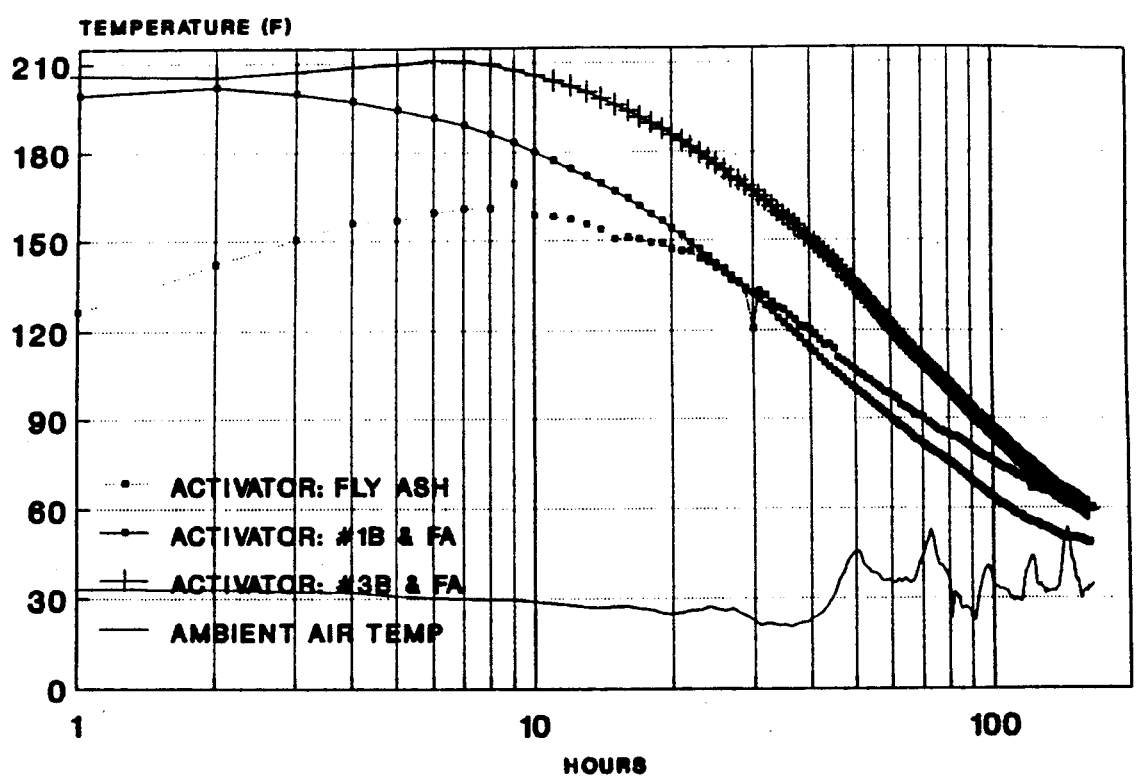
FIGS. 3 and 4 are graphs illustrating comparisons of temperature over time of stockpiles of sludge treated with various activators.
Figure 4:
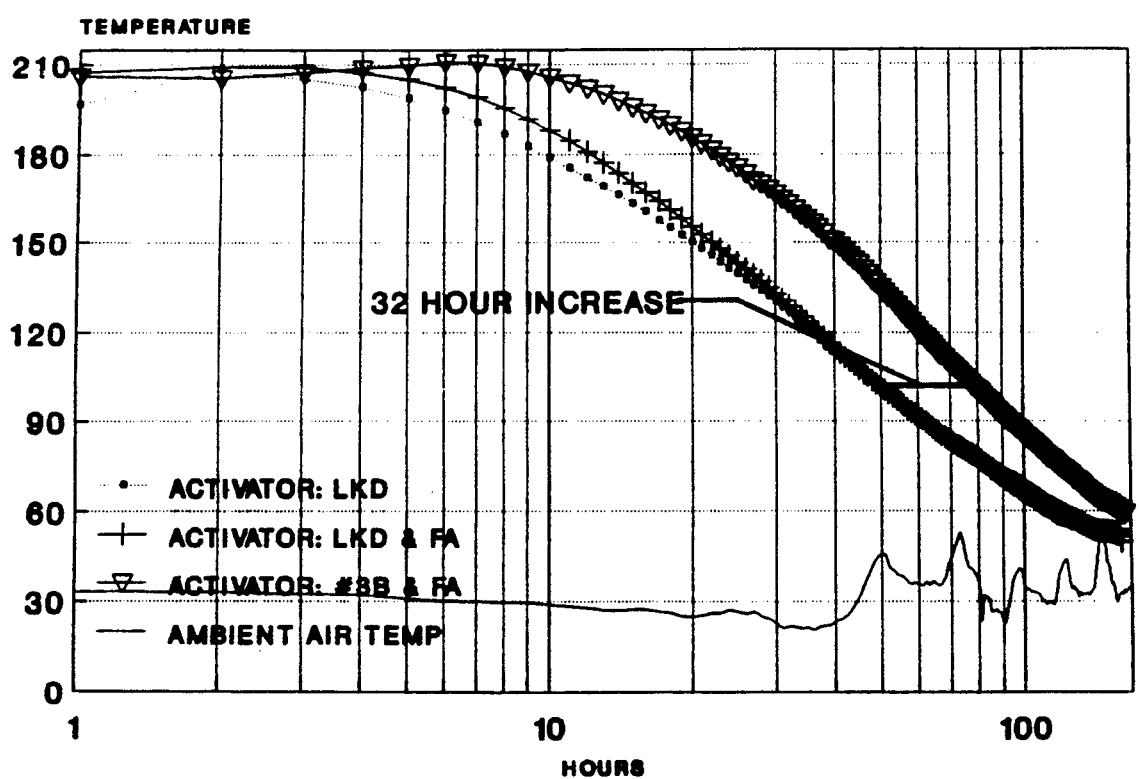

The degree to which the temperature will be sufficiently maintained may depend upon such factors as weather, including wind and ambient temperatures, and the size of the stockpiles, the type of insulating cover if used, or the size and type of storage facilities containing the final mixture. In cold weather, it may be necessary to compile larger quantities of the mixture so that the minimum temperature of the pile can be maintained. As can be seen on FIG. 3, even large temperature differentials have minimum effects on the ability of the mixed sludge and activator (1:4 Ratio FBCR:FA) material for the first 40 hours. FIG. 3 depicts the results obtained from two sources of FBCR. The analysis of these sources are those shown in Tables 5 and 6. As can be seen, among the different sources the composition will effect the heat generating capacity of the activators. FIG. 4 demonstrates the increase in hours which Activator 3B with fly ash has over a similar blend of lime kiln dust with or without fly ash in maintaining a temperature of 100° F. It can be further seen that the lime kiln dust was a rather reactive material which is an aspect which can vary quite significantly from batch to batch or source to source for this material. The rate of cooling is more constant after 40 hours with an average ambient temperature of 35°-37° F. The graphs of FIGS. 3 and 4 show the actual values measured on a small 4 cubic yard stockpile of the processed material. These values are the internal stockpile temperature, the differential between the ambient air and the internal stockpile, an hourly loss of internal temperature and a temperature gradient.

After the 72 hour sterilization period, the stabilized sludge can be used for fertilizer. While the pathogens are destroyed by the sustained heat, the sludge still contains substantial amounts of nutrients, such as nitrogen, calcium and other minerals which are essential for plant growth. This material can also be used to reduce the effects of salt buildup along roads and irrigated areas. As stated in a report from the U.S. Department of The Interior, Bureau of Mines, Bulletin 688, 1968, entitled "Utilization and Stabilization of Mineral Wastes":

"Soil amendments used to reduce salt availability to plants included sulfur-containing native and by-product gypsum, sulfur, sulfur plus limestone, pyrite, ferrites, and sulfuric acid. In field test plots established on saline soils, all additions of sulfur appeared to improve plant growth compared with growth on untreated control plots"

The activators of this invention include such compounds as mentioned above, as well as other trace minerals. In conjunction with the other compounds which may be present in the municipal sludge, a suitable fertile soil-like material is formed. In a publication entitled "Manual for Applying Fluidized Bed Combustion Residue to Agricultural Lands" published by the U.S. Department of Agriculture in August 1988, it is suggested that FBCR may be used, by itself, to improve soil. With the mixture of the present invention, the beneficial aspects of sewage sludge nutrients and the beneficial soil-treatment properties of FBCR are combined in a mixture which is easily handled, transported and stored. Further stated in the report from the Bureau of Mines:

"Plants can be grown well in pure sand cultures to which have been added a proper balance of all the necessary mineral compounds needed by the plant; but if a little organic matter, such as leaf mold, is added, the plants grow much better."

Thus, the mixture of the present invention makes a desirable fertilizer. The present invention has the consistency of soil, and can simply be spread on a field, without the need for plowing or disking.

Alternatively, because of its soil-like consistency, the mixture can be effectively used as a landfill material for land development. With the pathogens effectively eliminated, the mixture is environmentally safe. Further evidence has shown that this mixture is environmentally safe relative to its chemical properties and compositions as well. It can be used in a variety of applications, such as land reclamation and in solid-waste sites as a daily cover. The mixture, when compacted to specification, forms an acceptable fill material upon which to build. As shown in Table 8, this compacted material imparts low values of permeability.

TABLE 8

PERMEABILITY OF COMPACTED TREATED SLUDGE ASTM D-2434

| MATERIAL | LIME | FBCR #1A | FBCR #2B | FBCR #3 |
|---|---|---|---|---|
| Daily (cm/sec) Averages | 1.87E-06 | 2.87E-06 | 5.43E-07 | 2.97E-06 |
| | 1.89E-06 | 1.00E-06 | 3.37E-06 | 9.00E-07 |
| | 5.45E-06 | 2.15E-06 | 3.99E-06 | |
| | 4.87E-06 | 1.06E-06 | | |
| | | 2.70E-06 | | |
| | | 2.83E-06 | | |
| Combined Avg. | 3.52E-06 | 2.10E-06 | 2.63E-06 | 1.93E-06 |

The consistency of the final mixture will depend primarily upon the water content thereof, which may vary from 10% to 40%. This can be controlled by the degree to which the stockpiled or stored mixture is allowed to dry out. Once the pathogens have been eliminated by sustained heat, the mixture can be spread or otherwise handled in order to achieve the desired water content for a particular application.

Although preferred embodiments of the invention have been illustrated and described, it will be apparent to those skilled in the art that variations and modifications may be made within the scope of the inventive concepts disclosed herein. Accordingly, it is intended that the scope of the invention be limited only by the scope of the hereafter appended claims when interpreted in light of the pertinent prior art, and not by the scope of the embodiments disclosed.

I claim:

1. A method of stabilizing sewage sludge having substantial amounts of bacterial pathogens comprising:

placing an amount of said sludge in a pug mill;

adding to said sludge an additive selected from the group consisting of FBCR, fly ash, or a combination of FBCR and fly ash;

mixing said sludge and said additive to form a substantially uniform mixture, said mixture being formed without any separately added lime, said additive being added in an amount sufficient to cause a substantial exothermic chemical reaction, when mixed with said sludge, storing said mixture for a predetermined period of time at a predetermined temperature sufficient to cause said pathogens to be effectively eliminated from said mixture by heat generated by said exothermic chemical reaction.

2. A method of stabilizing sewage sludge in accordance with claim 1 wherein:

said additive is 100% fly ash.

3. A method of stabilizing sewage sludge in accordance with claim 1 wherein:

said mixture includes from about 10% to about 35% additive, and from about 90% to about 65% sludge.

4. A method of stabilizing sewage sludge in accordance with claim 1 wherein:

said mixture is stored for at least about three days, and wherein a substantial portion of said mixture is maintained at a temperature of at least about 90° F. for said three days.

5. A method of fertilizing a field comprising spreading on a field a sewage sludge stabilized in accordance with claim 1.

6. A method of disposing of solid waste wherein:

sludge stabilized in accordance with claim 1 is used as a daily cover for solid waste sites, including municipal waste landfills.

7. A method of making a landfill for land development wherein:

8. A method of stabilizing sewage sludge in accordance with claim 1 wherein:

said additive is 100% FBCR.

* * * * *